APPARATUS FOR INDICIA RECOGNITION
FIG. 1.
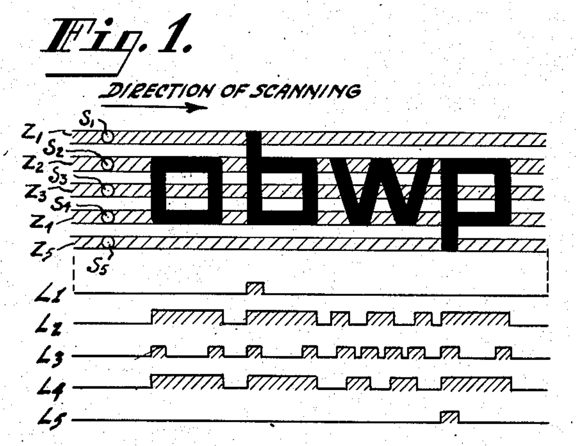
FIG. 1a.
| ZONE | o | b | w | p |
|---|---|---|---|---|
| #1 | 0 | 1 | 0 | 0 |
| #2 | 1 | 1 | 3 | 1 |
| #3 | 2 | 2 | 4 | 2 |
| #4 | 1 | 1 | 2 | 1 |
| #5 | 0 | 0 | 0 | 1 |
FIG. 2, FIG. 3, FIG. 4, FIG. 5, FIG. 9
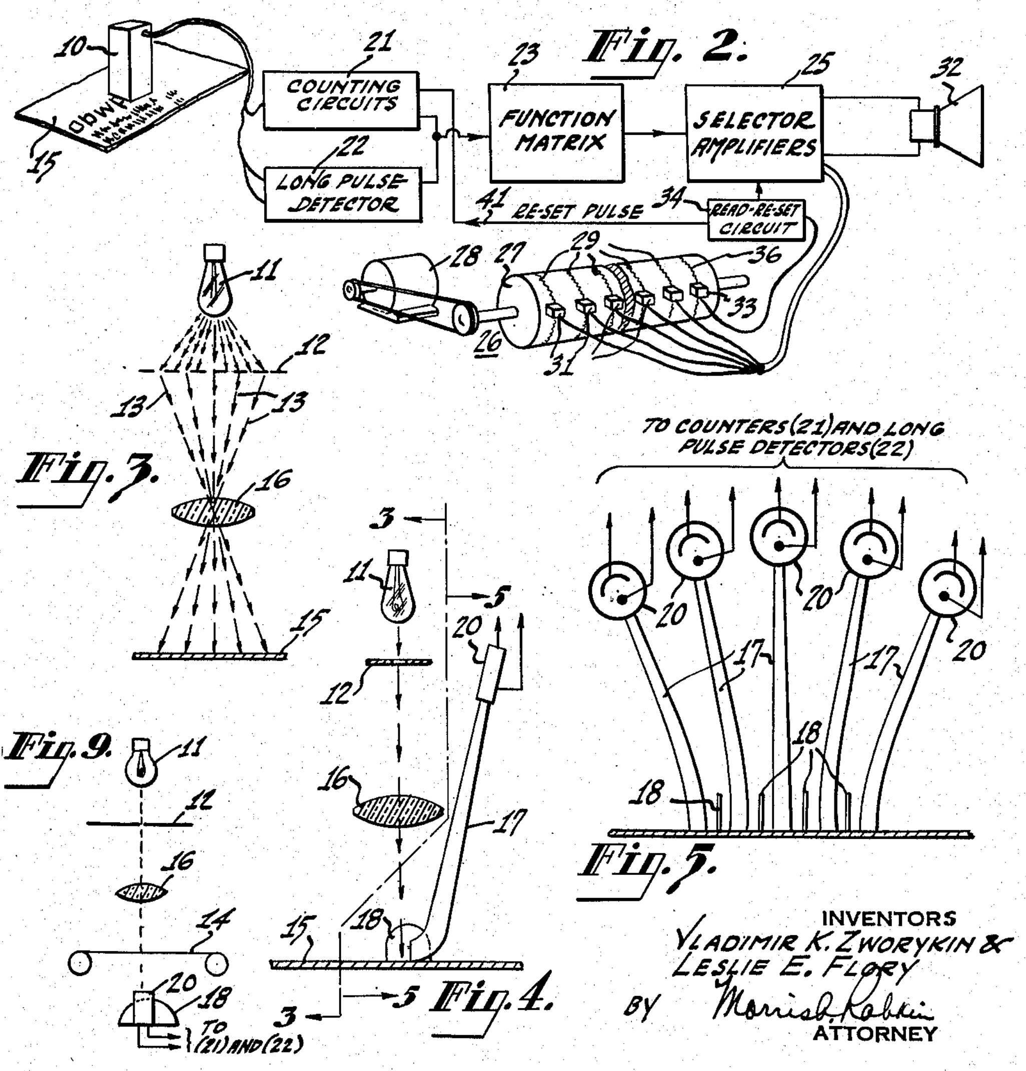
INVENTORS
VLADIMIR K. ZWORYKIN &
LESLIE E. FLORY
BY Morris L. Rabkin
ATTORNEY INVENTORS
VLADIMIR K. ZWORYKIN & LESLIE E. FLORY
BY Morris Kahn [signature]
ATTORNEY INVENTORS
VLADIMIR K. ZWORYKIN &
LESLIE E. FLORY
BY Morris B. Rabkin
ATTORNEY Patented Nov. 4, 1952 2,616,983

UNITED STATES PATENT OFFICE 2,616,983

APPARATUS FOR INDICIA RECOGNITION

Vladimir K. Zworykin and Leslie E. Flory, Princeton, N. J., assignors to Radio Corporation of America, a corporation of Delaware Application January 3, 1949, Serial No. 68,887

10 Claims. (Cl. 179—100.3)

Figure 6:
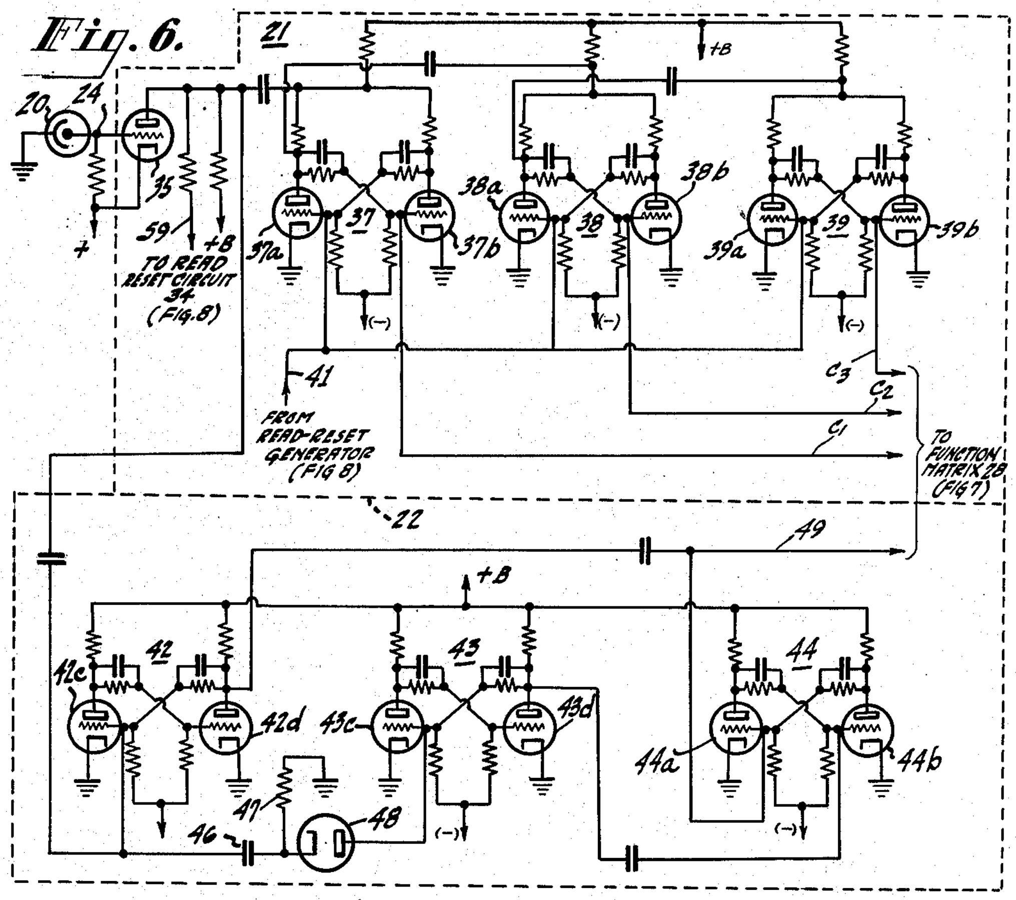

This invention relates to improvements in the art of indicia recognition, and more particularly to an improved method of an apparatus for generating electrical voltages or voltage groups having a predetermined relation to indicia of any characteristic shape or contour outlined on a contrasting surface.

While not limited thereto, the invention finds special application in reading aids for the blind, and will be particularly described in connection with apparatus for translating indicia into acoustical energy in the form of sounds characteristic of a spoken language. For the purpose of simple disclosure, the description will be limited to apparatus for recognizing and translating indicia in the form of printed letters, although it should be understood that the principles of the invention are equally applicable to the recognition and translation of indicia which are outlined by perforations, stampings, or any tracing in or on a surface whereby said indicia appear in contrast to said surface.

The prior art relating to reading aids for the blind is largely directed to methods of and devices for translating printed matter into arbitrary tones or tonal combinations having no relation to the sounds normally associated with spoken language. (See e. g. U. S. Patents 2,420,716; 1,350,954; 2,451,014). Some success has been achieved with devices of this type, but their obvious limitation resides in the fact that the operator must first be trained to recognize the various tones and tonal combinations in order to understand printed matter translated by such a device.

It has also been proposed to spell out or phonetically reproduce words and word combinations by means of a programming device such as a specially prepared tape having indicia of different lengths printed thereon. Such an arrangement is described in the copending application of L. E. Flory, Serial No. 713,175, filed November 29, 1946. While this arrangement overcomes the objection to the tonal system, it does not provide for direct translation of ordinary printed matter into intelligible speech. While the principles of the present invention are applicable to a system of the foregoing type, insofar as recognition of arbitrarily shaped or "coded" indicia is concerned, it will become apparent as the following description proceeds that the invention is not limited to the recognition of coded indicia, but is equally applicable to recognition and translation of intelligible indicia.

It is, accordingly, a principle object of the invention to provide an improved method of, and apparatus for recognizing indicia outlined on a contrasting surface, and for translating recognized indicia into usable form.

A further object of the invention is to provide an improved method and apparatus for translating printed matter into intelligible sounds.

Another object of the invention is to provide an improved method and apparatus for controlling the operation of a sound reproducer.

A further object of the invention is the provision of an improved device for translating changes in reflected light energy from printed matter into useable voltages or voltage groups.

Another object of the invention is to provide a device for audibly reproducing the individual letters and other elemental characters of printed material.

According to the invention, the foregoing and other objects and advantages are attained by scanning an indicia-bearing surface with a plurality of light beams which serve to divide the scanned surface into segmental zones. As will be brought out more fully hereinafter, an indicia-bearing surface scanned in the foregoing manner exhibits a distinctive pattern of light reflecting properties. The invention provides for recognition of each such distinctive pattern by counting the number of changes in light reflection occurring in each of the zones, and for controlled reproduction of the particular speech sound corresponding to the indicia recognized.

A more complete understanding of the invention may be had by reference to the following description of an illustrative embodiment thereof, when considered in connection with the accompanying drawings wherein:

Figure 1 illustrates diagrammatically the concept of segmental scanning of printed matter, Figure 1a is a table showing the pattern of light reflecting properties for each of the characters of Figure 1, Figure 2 is a view, partly in perspective and partly in block diagram form, showing a complete reading aid apparatus arranged in accordance with the invention, Figure 3 is a view on the line 3—3 of Figure 4, and shows a light projection system suitable for use in the reading aid of Figure 2, Figure 4 is a side view of a light projection and light pickup device suitable for use as a scanner in the system of Figure 2, Figure 5 is a section view on the line 5—5 of Figure 4, Figures 6, 7 and 8 are schematic diagrams of electrical circuits corresponding to the lettered blocks of Figure 2, and Figure 9 is a side view of a modified form of scanner for use in the apparatus of Figure 2.

One of the general principles on which the present invention is based can best be explained by reference to Figure 1, wherein there are shown four arbitrarily selected letters, *"o," "b," "w," "p,"* such as might be found in an ordinary line of printed matter. In Figure 1, the letters are to be scanned by five "spots" of light $S_1$—$S_5$ originating in five light beams (not shown). The spots of light $S_1$—$S_5$ may be said to divide the line of printed matter into five segmental zones $Z_1$—$Z_5$ defined by the paths of the light spots (or beams). The number of zones used is not critical, provided a sufficient number is used to distinguish between the letters. A five-zone system has been selected as illustrative of the invention, and it is believed that a minimum of five zones should be used to avoid having ambiguous results.

When the spots of light $S_1$—$S_5$ in Figure 1 are moved from left to right across the printed letters *"o," "b," "w," "p,"* the amount of light reflected from each of the zones $Z_1$—$Z_5$ will vary as each of the light spots encounters the contrasting black and white areas defined by the portions of each letter-outline appearing in each zone. This is illustrated by the five lines $L_1$—$L_5$ which have been placed beneath the letters in Figure 1, and which represent the reflecting properties of the printed matter within each of the five zones $Z_1$—$Z_5$. It will be understood that the shaded, offset portions of the lines $L_1$—$L_5$ correspond to subnormal or "black" reflecting portions of the printed matter, while the unshaded portions of the lines $L_1$—$L_5$ represent contrasting normal or "white" reflecting portions of the printed matter in Figure 1.

It will be noted that each of the letters in Figure 1 exhibits a characteristic light reflection pattern as the letters are scanned by the light spots $S_1$—$S_5$. This is illustrated by the table shown in Figure 1*a*, wherein the number of reflection changes per letter per zone is tabulated. It can be seen in Figure 1*a* that there is a unique combination of reflection changes per letter per zone for each of the four letters shown. As will be shown hereinafter, each of these unique combinations serves to identify the letter corresponding thereto, and can be reduced to voltage groups for controlling the reproduction of recorded letter-sounds or for any other desired purpose.

A further feature to be noted in connection with Figure 1 is that the black reflecting areas within each of the five zones are not all of the same length or duration. For example, in the case of the letter *"b,"* the areas of black reflection occurring in the first and third zones $Z_1$ and $Z_3$, are all of short duration, while the areas of black reflection occurring in the second and fourth zones, $Z_2$ and $Z_4$, are of longer duration. This is shown by the difference between the lengths of the shaded portions of the lines $L_1$—$L_4$ occurring under the letter *"b"* in Figure 1. As will be shown hereinafter, distinctions between long and short black reflection areas, within each of the segmental zones $Z_1$—$Z_5$ defined by the paths of the light spots $S_1$—$S_5$ of Figure 1, can be relied on as an aid in identifying the various characters of printed matter.

In Figure 2 of the drawings, there is shown a complete reading aid system arranged in accordance with the invention, with certain of the parts shown in perspective, and with the electrical circuit portions shown in block diagram form. In Figure 2, one of the elements of the reading aid system is seen to comprise a scanning device 10, for projecting light energy onto a sheet of printed matter 15, and for picking up the light reflected from each of a plurality of segmental zones of the printed matter 15.

In Figures 3, 4, and 5, the scanning device 10 of Figure 2 is shown in detail, and is seen to include (see Figure 3) a source of light energy, such as an incandescent lamp 11, placed above a perforated mask 12 which serves as the virtual source of a plurality of light beams 13. The light beams 13 are focused on a sheet of printed matter 15 by means of a focusing lens 16, and serve to form the light spots $S_1$—$S_5$ previously referred to in connection with Figure 1.

Figure 4 is a side view of a combined light projection and light pickup device, such as may be used in the scanner 10 of Figure 2, and which may comprise a group of quartz or Lucite (methyl-methacrylate resin) light collectors 17, separated by light shields 18 to ensure absolute separation between the segmental zones of the printed matter. Each of the Lucite collectors 17 conducts reflected light to a light-sensitive element 20, such as a photoelectric cell or a photo-multiplier, wherein changes in the amount of reflected light are translated into changes in output current or voltage. The changes in the output voltage of the light sensitive elements 20 are utilized in the circuits of Figure 2 to distinguish between the characters of the printed matter.

Figure 9 shows the elements of a modified scanning arrangement suitable for use in the apparatus of Figure 2. In Figure 9, the indicia-bearing surface comprises a photographic film 14 of comparable translucent medium having the indicia to be translated thereon. In this case, the light source 11, the perforated mask 12, and the lens 16 are located on one side of the surface 14 having indicia thereon, while the light sensitive elements 20 and the light shields 18 are located on the other side of the surface 14. In this case, changes in the amount of light passing through the film are translated into changes in output current or voltage by the photocells 20. It will be observed that the scanning arrangement shown in Figure 9 differs from that shown in Figures 3, 4, and 5 only to the extent that variations in light-transmitting properties of the surface 14 having indicia thereon are utilized in the scanning arrangement of Figure 9, while variations in light-reflecting properties of the indicia-bearing surface are relied on in the scanning arrangement of Figures 3, 4, and 5. For simplicity, the present discussion will be limited to scanning a surface having indicia thereon of contrasting light-reflecting properties. However, the terms "light-reflecting properties," and "reflected light," as used herein and in the appended claims, will be understood to include "light-transmission properties" and "transmitted light" as explained in the foregoing.

As shown in Figure 2, the output of the scanner 10 is connected to a plurality of counting circuits 21, wherein the number of white-to-black reflectance changes, occurring in the course of scanning each printed character, are counted. Pulse length detecting circuits 22 may also be used, to distinguish between black reflecting areas of different lengths within each of the hypothetical zones. The counters 21 and the pulse length detectors 22 provide information in the form of groups of voltages, each such group being distinctive of a predetermined number of reflectance changes of predetermined duration. The groups of voltages are all supplied to a matrix network 23, which will be referred to herein and in the appended claims as a function matrix. The term "function matrix" is used in this specification and in the accompanying claims to designate a network of input conductors, to which voltages of the same or different magnitude may be applied, said input conductors being connected in predetermined groups through high resistance elements to conductors serving as output conductors for the network, the arrangements being such that no two output conductors are connected to the same group of input conductors. In such a network, individual voltages applied to all of the input conductors can be combined in predetermined groups for any desired purpose, as, for example, the separation of voltage groups characteristic of printed characters.

In the function matrix 23, the various groups of voltages from the circuits 21, 22 are segregated or "recognized," and made available as control voltages for a plurality of selector-amplifiers 25. The selector-amplifiers 25 selectively control the output of a sound reproducing system 26.

The sound reproducing system 26 may comprise a rotatable magnetic drum 27, driven by a motor 28, and provided with a plurality of magnetically recorded sound tracks 29 spaced axially along the surface of the drum 27. Each of the sound tracks 29 comprises a recording of one of the letter or other sounds characteristic of a spoken language, and is so recorded that one complete reproduction of the letter-sound can be had in one revolution of the drum 27. A signal pickup unit (magnetic sound-head) 31 is provided for each of the sound tracks 29, each of the pickup units 31 being connected to an individual selector-amplifier circuit 25. The drum 27 is rotated continuously by the motor 28, so that an electrical signal corresponding to one of the letter sounds recorded on the drum 27 is continuously available at each of the pickup units 31. When the function matrix 23 "recognizes" a voltage group corresponding to a particular printed letter or character, one of the selector amplifier circuits 25 will pass the signal generated by the pickup unit 31 associated therewith, and the selected signal will be converted into acoustical energy by a loud speaker 32 connected in parallel with all of the selector amplifier circuits 25.

In order to insure that the reproduction of each letter sound will begin at the proper point in the rotation of the drum 27, an additional signal track 36 is provided on the drum 27. The signal track 36 carries a recorded synchronizing pulse which is picked up by a pickup unit 33 and passed into a read-and-reset generator circuit 34. In the generator circuit 34, voltages are generated for partially energizing all of the selector amplifiers 25 at the end of each letter scan, and for resetting the counting circuits 21, as will be described hereinafter. It will be understood that the particular form of sound reproducing system shown is purely illustrative, and could as well comprise other comparable systems known in the art. For example, sound reproducing systems of the type described in the aforementioned Flory application are suitable for use in the reading aid of the present invention.

Turning now to a consideration of specific circuits corresponding to the block diagram portions of Figure 2, in Figure 6 there is shown a diagram of a counter circuit 21 and a pulse-length detector circuit 22, corresponding to the lettered blocks 21, 22 in the system of Figure 2. In order to simplify the drawing, only one counter circuit 21 and one pulse-length detecting circuit 22 have been shown in Figure 6, although it will be understood that the total number of counting circuits 21 will correspond to the selected number of segmental zones of illumination in any particular system, while the number of pulse-length detecting circuits may vary, depending on the type-face of the letters to be scanned. In the system presently being described, five counting circuits 21 and five pulse-length detecting circuits 22 are required.

The input stage for the counting circuit 21 comprises one of the photocells 20 of the scanning device 10 of Figure 2, the arrangement being such that a positive pulse of voltage will be developed at the output 24 of the photocell 20 when the amount of reflected light reaching the photocell decreases. This, of course, will occur when a "black" portion of a printed character appears in the zone corresponding to that photocell. Each positive pulse from the photocell 20 is inverted in an amplifier 35, so that a negative pulse will appear at the plate of the amplifier 35 during the scanning of any area of black reflection in the zone associated therewith. The pulse counting portion of the circuit 21 comprises three binary counter stages 37, 38, 39, of a type well known in the art. (See e. g. U. S. Patents 2,404,047 and 2,410,156). Each binary counter stage 37, 38, 39 consists of a balanced trigger circuit, comprising a pair of vacuum tubes symmetrically coupled to each other and to a common source of plate supply voltage (not shown). A balanced trigger circuit of this type will remain in a stable condition, with either one of the tubes conducting and with the other tube nonconducting, until a negative triggering pulse is applied to the grid of the conducting tube, or until a positive triggering pulse is applied to the grid of the nonconducting tube, to cause a reversal of the circuit conditions. The circuit will then remain quiescent in the new condition of conduction-nonconduction until a suitable pulse is applied to the grid of one of the tubes, whereupon the circuit will return to its original condition.

In the counting circuit 21 of Figure 6, positive triggering pulses from a reset circuit 34, (see Figure 8) to be described hereinafter, are utilized to make the tubes *37a*, *38a*, *39a* the conducting tubes prior to any counting action in the circuit 21 (i. e. to bring the circuit 21 to the "zero-count" condition). A negative pulse applied to the first stage 37 of the counting circuit 21 from the amplifier 35 (when the circuit 21 is in the "zero-count" condition) will cause the tube *37a* to cut off, with the result that the other tube *37b* in the first stage 37 will be turned on. A second negative pulse applied to the circuit 21 will cause the first stage 37 to return to its original condition with the tube *37a* conducting, and the resulting drop in voltage at the plate of the tube *37a* will generate a negative pulse which will cause a reversal in the second stage 38. Each time that the tube *37a*, *38a*, or *39a* in one of the counter stages 37, 38, 39 is turned on, the resulting voltage drop at the plate of that tube will generate a negative "carry-over" pulse which is applied to the next succeeding stage of the counter circuit 21. Therefore, the first negative pulse occurring at the input to the counter circuit 21 will cause a reversal of conditions only in the first stage 37, the second negative pulse will cause a reversal in both the first and the second stages 37, 38, the third negative pulse will cause a reversal only in the first stage 37, and the fourth negative pulse will cause a reversal in all of the stages of the counter 21.

The output of the counter circuit 21 is taken from leads $C_1$, $C_2$, $C_3$ connected to the grids of the tubes 37*b*, 38*b*, 39*b*, respectively in the counter circuit.

In order to simplify the discussion, the terms "high" and "low" voltage have been used herein to designate "more positive" and "less positive" voltages, respectively, rather than the relative absolute magnitudes of voltages. When the circuit 21 is in the "zero count" condition, all of the output leads $C_1$, $C_2$, $C_3$ will be at a relatively low potential corresponding to the cut-off voltage on the grids of the tubes 37*b*, 38*b*, 39*b*. When a first negative pulse is applied to the counter circuit 21, the voltage on the lead $C_1$ from the first stage 37 will become relatively high as the tube 37*a* is cut off and the tube 37*b* is turned on. On the application of a second negative pulse to the circuit 21, the voltage on the lead $C_2$ from the second stage 38 will become relatively high, while the voltage on the lead $C_1$ from the first stage 37 will again become relatively low. The third applied negative pulse will cause the voltage on the lead $C_1$, from the first stage 37, to become relatively high, but will not affect the other output leads $C_2$, $C_3$, while the fourth applied negative pulse will cause the voltage on the leads $C_1$, $C_2$, from the first and second stages 37, 38, to become relatively low, and will cause the voltage on the lead $C_3$ from the third stage 39 to become relatively high. Thus, a different group of "high" and "low" voltages will be available on the output leads $C_1$, $C_2$, $C_3$ after every negative pulse (up to 4 in number) which is applied to the circuit 21. This is shown in the following table, wherein the relative voltage on each of the output leads $C_1$, $C_2$, $C_3$ is shown, for the "zero-count" condition, and after each of four negative pulses from the amplifier 35 have been applied to the circuit 21.

*Table I*

| Pulse No. | $C_1$ | $C_2$ | $C_3$ |
|---|---|---|---|
| 0 | low | low | low |
| 1 | high | low | low |
| 2 | low | high | low |
| 3 | high | high | low |
| 4 | low | low | high |

Figure 7:
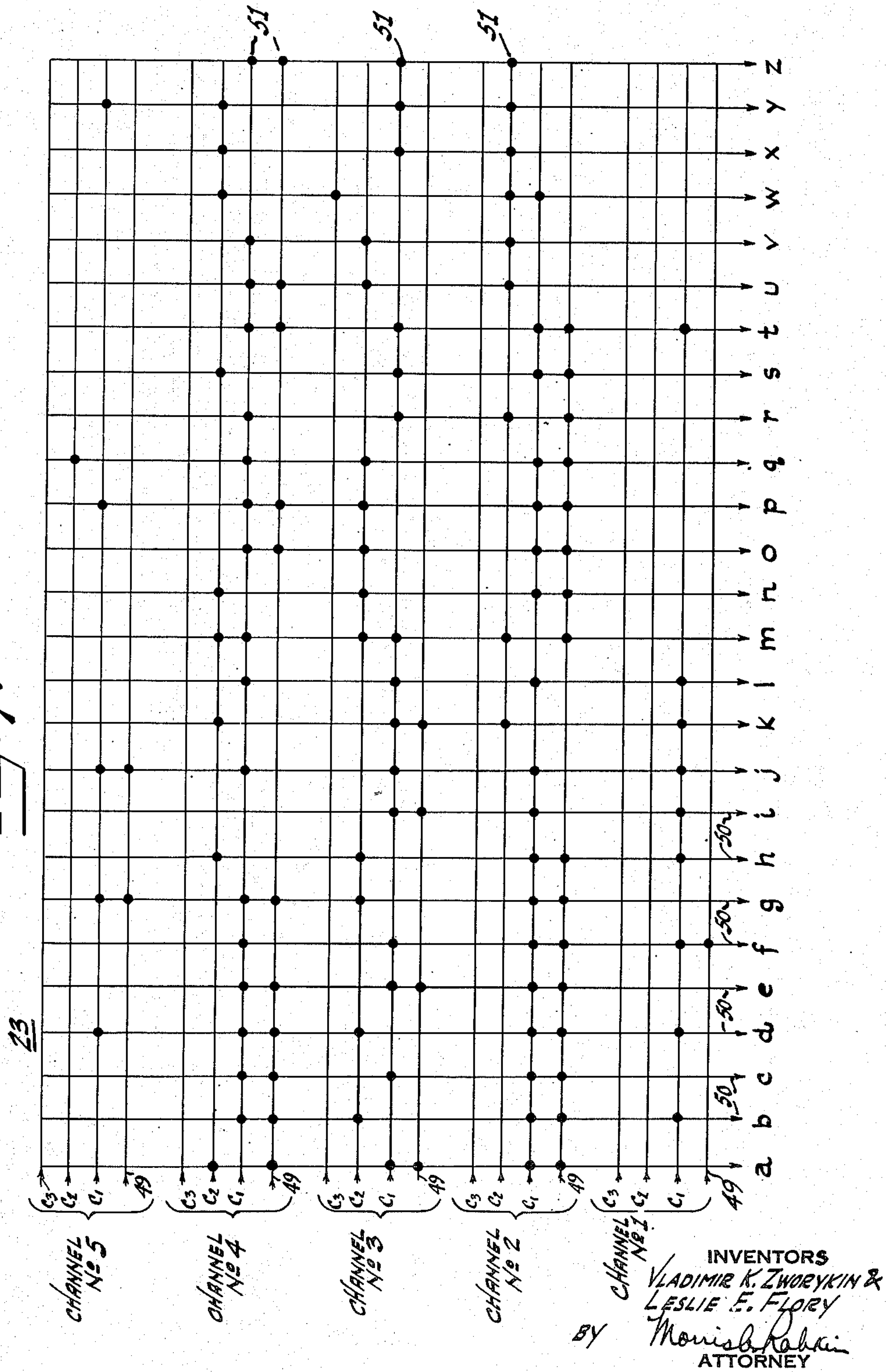

The voltages on the output leads $C_1$, $C_2$, $C_3$ of all of the counter circuits 21 in the system of Figure 2 are carried into the function matrix 23, and will be referred to again in the discussion of Figure 7.

After any one character of the printed matter has been scanned, it is necessary to reset the counter circuit 21 to the "zero count" condition. This is accomplished by applying a positive reset voltage pulse to the grids of the tubes 37*a*, 38*a*, 39*a* in the counter circuit 21, through a reset bus 41. The reset pulses for the counter circuit 21 are obtained from a read-reset circuit 34 associated with the sound reproducing device 26 in Figure 2, as will be described hereinafter in connection with Figure 8.

As was previously mentioned, a pulse length detecting circuit 22 is used in the system of Figure 2 for distinguishing between black reflectance pulses of long and short duration. It will be understood that the distinction between "long" and "short" black reflectance pulses is only a relative concept, and that the actual duration of each black reflectance pulse will be dependent upon the rate at which the printed material is traversed by the scanning device 10 in Figure 2. However, for any substantially constant scanning rate, the duration of the "long" and "short" black reflectance pulses will also be substantially constant.

In Figure 6, there is shown a pulse length detecting circuit 22, which includes three trigger stages 42, 43, 44. Two of the trigger stages, 42 and 43, are of the unbalanced, or so-called "slide-back" type, described in U. S. Patent 2,404,047, while the third trigger stage 44 is of the balanced type previously described herein.

As is explained in U. S. Patent 2,404,047, an unbalanced or "slide-back" type of trigger circuit, such as the stages 42 and 43 of Figure 6, has a normal, predetermined condition of conduction-nonconduction. For example, in the stages 42 and 43, it is assumed that the circuit constants have been so selected that the section 42*c* is the normally conducting section in the stage 42, while the section 43*c* is the normally conducting section in the stage 43. When a negative voltage pulse from the amplifier 35 is applied to the normally conducting section of either of the unbalanced trigger stages 42, 43, the conditions of conduction-nonconduction in that stage will be reversed, and will remain reversed during the time that the negative voltage pulse is applied thereto. When the negative pulse ends, circuits 42, 43 will return to their normal, predetermined condition after a time interval determined by the parameters of the circuits. The parameters of the first unbalanced trigger stage 42 are so chosen that the stage 42 will return to its normal condition of conduction (i. e. with the tube 42*c* conducting) almost immediately at the end of any negative voltage pulse applied thereto. The parameters of the other unbalanced trigger stage 43 are so chosen that the stage 43 will remain reversed, after the end of an applied negative voltage pulse, for a time slightly shorter than the predetermined time required to scan a "long" black reflection area.

The first unbalanced trigger stage 42 is coupled directly to the amplifier 35, while the other unbalanced trigger stage 43 is coupled to the amplifier 35 through a differentiating circuit comprising a capacitor 46 and a resistor 47, and through a rectifier 48. Negative voltage pulses at the plate of the amplifier tube 35 will appear in substantially unmodified form at the grid of the normally conducting tube 42*c* in the first trigger stage 42, while a short duration (differentiated) negative pulse will appear at the grid of the normally conducting tube 43*c* in the second trigger stage 43 for each negative pulse, regardless of duration, at the plate of the tube 35. Hence, the first unbalanced trigger stage 42 will remain inverted for a time substantially equal to the duration of any negative pulse at the output of the amplifier 35, while the other unbalanced trigger stage 43 will always return to normal, after reversal, within a time interval slightly shorter than the duration of "long" black-reflectance pulses. The relative duration of each negative, black-reflectance pulse from the amplifier 35 will determine which of the two unbalanced trigger stages 42, 43 will return last to its normal condition of conduction, and in view of the foregoing discussion, it will be apparent that the unbalanced trigger stage 43 will be the last to revert to normal after the occurrence of a "short" black-reflectance pulse, while the unbalanced trigger circuit 42 will be the last to revert to normal after a "long" black-reflectance pulse.

The balanced trigger stage 44 of the pulse-length detector 22 serves to reduce pulse-length information, derived from the two unbalanced trigger stages 42, 43, into useable form. As shown in Figure 6, each of the sections **44*a*, 44*b* of the ablanced trigger stage 44** is connected to the normally nonconducting ("*d*") section of one of the unbalanced stages 42, 43. When either of the unbalanced stages 42, 43 returns to normal after reversal, a positive pulse will be applied to the corresponding section, **44*a* or 44*b*, of the balanced trigger stage 44, forcing conduction in that section. It follows, then, that the conditions of conduction non-conduction in the balanced trigger stage 44, after the termination of each black-reflectance pulse, will be indicative of the relative duration of that black-reflectance pulse. The output of the pulse length detecting circuit 22 is taken from the grid of the section 44*a* of the balanced trigger stage 44 on a lead 49, and is in the form of a relatively "high" or "low" voltage, similar to the output of each stage of the counting circuit 21. It will be seen that a "high" voltage on the lead 49 will indicate the occurrence of a "long" black-reflectance area in the zone with which a particular pulse length circuit 22 is associated, while a "low" voltage on the lead 49 will indicate a "short" black-reflectance area. The leads 49 from all of the pulse counting circuits 22 of Figure 2 are connected into the function matrix 23**, and will be referred to again in the discussion thereof.

In Figure 7, a function matrix 23 is shown, which comprises twenty "horizontal" input leads $C_1$, $C_2$, $C_3$, 49, and twenty-six "vertical" output leads 50, interconnected by high resistance elements 51, say of the order of several megohms. In order to simplify the drawing, the resistors 51 have been shown as heavy dots at the intersections of the input and output leads interconnected thereby. The input leads $C_1$—$C_3$, 49 of the function matrix 23 are arranged in five groups or channels, each such channel corresponding to one of the zones $Z_1$—$Z_5$ of the printed matter to be scanned. It will be understood that the input leads $C_1$, $C_2$, $C_3$, 49 for each channel are merely extensions of the output leads $C_1$, $C_2$, $C_3$ of the pulse counting circuit 21 of Figure 6, and of the output lead 49 of the pulse length detecting circuit 22 of Figure 6. As was previously explained, five of each of the counting and pulse length circuits 21, 22 are required in the system presently being described.

Each of the output leads 50 of the function matrix 23 is allotted to one of the letters of an alphabet, and is connected to a preselected group of input leads $C_1$—$C_3$, 49, from the various channels. It should be noted that the particular function matrix 23 shown in Figure 7 is properly connected for recognition of an alphabet set in the type-face shown in Figure 7 only. This is necessary for the reason that one letter, set in a given type-face, may yield a different characteristic pulse count in one or more zones than the same letter will yield when set in a different type-face. However, the principles to be applied in connecting a function matrix to recognize any given type-face are always the same, and merely require a predetermination of the pulse counts which are peculiar to the particular letter and type-face involved. For example, in the case of the letter "*b*," it will be seen in Figures 1 and 1*a* that the letter "*b*" will yield one pulse in zone number 1, one (long) pulse in zones 2 and 4, two pulses in zone number 3, and "zero" pulses in zone number 5. Referring to the table above, it will be seen that the foregoing pulse count will result in a high voltage on the lead $C_1$ in channels 1, 2, and 4, a high voltage on the lead $C_2$ in channel 3, a low voltage on the leads $C_1$, $C_2$, and $C_3$ in channel 5, and a high voltage on the pulse length lead 49 in channels 2 and 4 (due to the occurrence of "long" black-reflectance pulses in each of the zones 2 and 4). Thus, at the end of scanning the letter "*b*," all input leads of the matrix 23 which are connected to the "*b*" output lead will be in the "high" voltage condition. On the other hand, a computation of the pulse count in each zone for each of the other letters, *a*, *c*—*z*, of the alphabet will show that, for any letter other than "*b*," one or more of the input leads of the function matrix 23 to which the output lead 50 for the letter "*b*" is connected, will be in the low voltage condition. A plurality of selector amplifier circuits 25, of the type shown in Figure 8, are provided, to distinguish between various voltage conditions at the matrix output leads 50, as will now be described.

Figure 8:
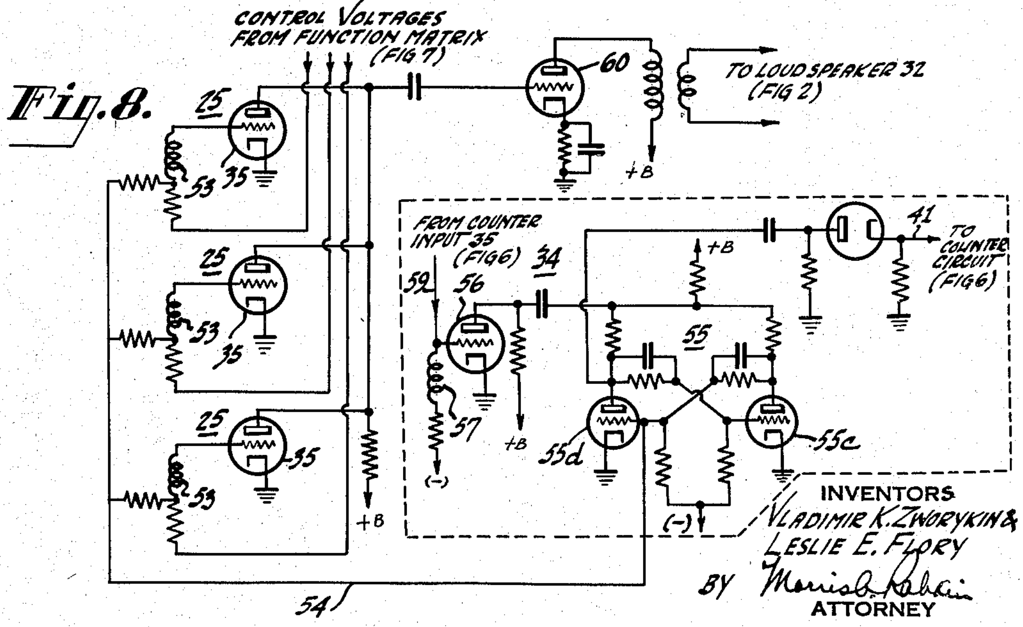

Each of the output leads 50 of the function matrix 23 is connected to one of the selector amplifier circuits 25, three of which are shown in Figure 8. It will be understood that a complete system as shown in Figure 2 requires at least twenty-six selector-amplifier circuits 25. The selector-amplifier circuits 25 function as "gate" circuits, permitting signals to pass therethrough only under certain predetermined conditions. Each of the selector amplifiers 25 is adapted to receive a signal, corresponding to one recorded letter-sound, from a pickup coil 53 in one of the pickup heads 31 of Figure 2. The grids of all of the selector amplifiers 25 are connected through a common lead 54 to one of the sections **55*d* of a trigger circuit 55. The trigger circuit 55 forms part of a read-and-reset voltage generator circuit 34, and is of the unbalanced or slide-back type previously described, wherein the section 55*d* is the normally nonconducting section. The cut-off voltage normally present at the grid of the section 55*d* is applied to each of the selector amplifier circuits 25 via the lead 54. Hence, none of the selector-amplifiers 25 can pass audio frequency signals from the pickup coils 55 until the grid bias for a given amplifier 25 has been raised above the cut-off level. It has already been shown that the scanning of any given letter in the printed matter leaves a high voltage on all input leads of the matrix 23 which are common to the matrix output lead 50 associated with that letter. While this condition is one of the requirements for turning on any given amplifier 25, it is also necessary that the voltage on the lead 54 be raised by reversal of the trigger circuit 55 before a given amplifier 25 will pass any signals. In order to explain the action of the read-and-reset trigger circuit 55**, it is necessary to refer back to the action of the counting circuit 21 of Figure 6.

It will be recalled that a negative voltage pulse will appear at the plate of the amplifier 35 in the counting circuit 21 of Figure 6 whenever black reflecting conditions occur in the zone associated therewith, and will persist for the duration of the black reflectance. The plates of the amplifier tubes 35 in the counting circuits 21 for all of the zones 1 through 5 are connected to the grid of the input stage 56 of the reset circuit 34, through a lead 59. As long as black reflectance persists in any zone of the printed matter, the voltage at the grid of the input stage 56 of the circuit 34 will remain below the necessary level for conduction therein. However, when the scanning of any one letter has been completed, the voltage at the plates of all of the counting circuit amplifiers 35 will rise, permitting conduction in the input stage 56 of the circuit 34 of Figure 8. A coil 57 in the grid circuit of the input stage 56 comprises the pickup coil in the synchronizing-pulse pickup unit 33 in Figure 2. In Figure 8, when the input stage 56 is turned on at the end of a letter scan, a negative pulse from the coil 57 will cause a reversal of conditions in the trigger circuit 55. The resulting rise in voltage on the lead 54 will complete the gating action in any selector-amplifier 25 which is properly energized by a group of high voltages from the function matrix 23, and the selected letter-sound signal will be passed through the amplifier 25 and a common amplifier stage 60 to the loudspeaker 32 in Figure 2. The slide-back time of the trigger stage 55 of the circuit 26 is made equal to the reproduction time of one recorded letter sound (i. e. one revolution of the drum 27 of the sound reproducing system 26 in Figure 2). At the end of each sound reproduction period, a positive pulse will be generated at the plate of the normally nonconducting section 55*d* of the trigger circuit 55 as the latter reverts to normal conditions, and it is this positive pulse which is the reset pulse for the counter circuits 21 of Figure 6.

Summarizing, briefly, the action of the system of Figure 2, it has been shown that any given selector amplifier 25 can operate only at the end of a letter-scan, and only on the occurrence of a predetermined "high" voltage group on the input leads of the function matrix 23 of Figure 7.

It has also been shown that the counter circuits 21 and pulse length circuits 22 are adapted to reduce light-reflection changes into voltage groups distinctive of the letters of printed matter scanned with a plurality of light beams. It will be clear, therefore, that a reading aid system of the type described is adapted to reduce printed matter into articulate sounds characteristic of a spoken language through the medium of distinctive groups of control voltages developed in the course of scanning printed matter with a plurality of light beams. It should be noted that the information furnished by the pulse length detecting circuits 22 of Figure 2 can be dispensed with by using a larger number of scanning zones in order to obtain more "pulse count" information in place of "pulse length" information. Therefore, it will be understood that the method of light-to-sound translation described herein is not limited to the use of a uniform scanning rate. Moreover, it is apparent that individual light beams are not required where means, such as the separator masks 18 of Figures 4 and 5, are used to separate reflected light from the printed matter.

It is apparent that the principles of indicia recognition and translation set forth herein are by no means limited to use with an acoustic reproduction system. For example, characteristic voltages or voltage groups generated in accordance with the invention could be utilized to control the operation of a Braille character printer in order to translate the characters of ordinary printed matter into Braille system characters. The invention is also applicable to accounting and tabulating systems for recognizing printed or perforated indicia on index cards. Where perforated cards are used, a scanning system comparable to that shown in Figure 9 may be found to be advantageous.

An alternative form of apparatus for practicing the method of the present invention is shown in the copending application of L. E. Flory and W. S. Pike, Serial No. 68,888, filed January 3, 1949.

It is also apparent that arbitrary coded indicia other than the characters of an alphabet could as well be recognized by the method and apparatus described, such as the punched or perforated patterns comprising Teletype code and the like.

Since many such modifications are possible in the method and apparatus shown and described, all within the scope and spirit of the invention, the foregoing is to be construed as illustrative, and not in a limiting sense.

What is claimed is:

1. Apparatus for recognizing and translating from a given surface indicia thereon of contrasting energy-reflective properties, said apparatus comprising, a source of energy, means for scanning a plurality of segmental zones of said surface with beams of energy projected upon said surface from said source, means including an element responsive to reflected energy originating in said beams and reflected from said surface for determining the number of changes in the amount of energy reflected from said surface within each of the zones scanned by said beams, and means effectively coupled to said last-mentioned means for generating voltages having a predetermined relation to the number of said changes counted for each of said zones.

2. Apparatus for recognizing and translating from a given surface indicia thereon of contrasting energy-reflective properties, said apparatus comprising, a source of energy, means for scanning a plurality of segmental zones of said surface with beams of energy projected upon said surface from said source, means including an element responsive to reflected energy originating in said beams and reflected from said surface for determining the number and the duration of changes in the amount of energy reflected from said surface within each of the zones scanned by said beams, and means effectively coupled to said last-mentioned means for generating voltages having a predetermined relation to the number and the duration of said changes for each of said zones.

3. Apparatus for recognizing and translating from a given surface indicia thereon of contrasting light-reflective properties, said apparatus comprising, a source of light, means for scanning a plurality of segmental zones of said surface with beams of light projected upon said surface from said source, means including an element responsive to reflected light originating in said beams and reflected from said surface for determining the number of changes in the amount of light reflected from said surface within each of the zones scanned by said beams, and means effectively coupled to said last-mentioned means for generating voltages having a predetermined relation to the number of said changes counted for each of said zones.

4. Apparatus for translating printed matter composed of a given surface having characters printed thereon of contrasting energy-reflective properties into articulate sounds characteristic of a spoken language, said apparatus comprising, a source of energy, means for scanning a plurality of segmental zones of said printed matter with beams of energy projected upon said printed matter from said source, means including an element responsive to reflected energy originating in said beams and reflected from said printed matter for determining the number of changes in the amount of energy reflected from said printed matter within each of the zones scanned by said beams, means coupled to said first named means for generating voltages corresponding to distinctive combinations of said numbers of changes, means for producing sounds characteristic of a spoken language, and means responsive to said voltages from said generating means for controlling said sound producing means.

5. Apparatus for translating printed matter composed of a given surface having characters printed thereon of contrasting light-reflective properties into articulate sounds characteristic of a spoken language, said apparatus comprising, a source of energy, means for scanning a plurality of segmental zones of said printed matter with beams of energy projected upon said printed matter from said source, means including an element responsive to reflected energy originating in said beams and reflected from said printed matter for determining the number and the duration of changes in the amount of energy reflected from said printed matter within each of the zones scanned by said beams, means coupled to said first named means for generating groups of voltages corresponding to distinctive combinations of said numbers of changes, means for producing sounds characteristic of a spoken language, and means responsive to said voltage groups from said generating means for controlling said sound producing means.

6. Apparatus for translating printed matter composed of a given surface having characters printed thereon of contrasting light-reflective properties into articulate sounds characteristic of a spoken language, said apparatus comprising, a source of light, means for scanning said printed matter with light projected upon said printed matter from said source, means including light pickup elements responsive to reflected light originating at said source and reflected from segmental zones of said printed matter for determining the number of changes in the light-reflective properties of said printed matter within each of said zones as said printed matter is scanned, means coupled to said first-named means for generating groups of voltages having a predetermined relation to distinctive combinations of said numbers of changes, means for producing sounds characteristic of a spoken language, and means responsive to said voltage groups from said generating means for controlling the operation of said sound producing means.

7. Apparatus for translating printed matter composed of a given surface having characters printed thereon of contrasting light-reflective properties into articulate sounds characteristic of a spoken language, said apparatus comprising, a source of light, means for scanning a plurality of segmental zones of said printed matter with a plurality of light beams projected upon said printed matter from said source, means including a light sensitive element for picking up reflected light originating in said beams and reflected from said printed matter, a counting circuit coupled to said pickup means for counting the number of changes in the light-reflecting properties of said printed matter within each of said zones and for generating groups of voltages representative of the number of changes counted, sound producing means including a plurality of reproducible recordings for producing sounds characteristic of a spoken language, and means adapted to distinguish between and to respond to said voltage groups for controlling the operation of said sound producing means.

8. Apparatus for translating printed matter composed of a given surface having characters printed thereon of contrasting light-reflective properties into articulate sounds characteristic of a spoken language, said apparatus comprising, a source of light, means for scanning a plurality of segmental zones of said printed matter with a plurality of light beams projected upon said printed matter from said source, a plurality of light sensitive elements for picking up reflected light originating in said beams and reflected from said printed matter, a plurality of counting circuits and a plurality of pulse-length detecting circuits coupled to said pickup means for generating groups of voltages representative of the number and of the duration of changes in the amount of reflected light picked up by said elements from each of said zones as said printed matter is scanned, sound producing means including a plurality of reproducible recordings for producing sounds characteristic of a spoken language, and means adapted to distinguish between and to respond to said voltage groups for controlling the operation of said sound producing means.

9. Apparatus for translating printed matter composed of a given surface having characters printed thereon of contrasting light-reflective properties into articulate sounds characteristic of a spoken language, said apparatus comprising, a source of light, means for scanning a plurality of segmental zones of said printed matter with a plurality of light beams projected upon said printed matter from said source, a plurality of light sensitive elements for picking up reflected light originating in said beams and reflected from said printed matter, a plurality of counting circuits and a plurality of pulse-length detecting circuits coupled to said pickup means for generating groups of voltages representative of the number and of the duration of changes in the amount of reflected light picked up by said elements from each of said zones as said printed matter is scanned, sound producing means including a plurality of reproducible recordings for producing sounds characteristic of a spoken language, a function matrix connected to said circuits for separating said voltage groups, and means connected to said function matrix and responsive to said voltage groups for controlling the operation of said sound producing means.

10. Apparatus for translating printed matter composed of a given surface having characters printed thereon of contrasting light-reflective properties into articulate sounds characteristic of a spoken language, said apparatus comprising, a scanning device including (1) a source of light, (2) means for illuminating a plurality of segmental zones of said printed matter with a plurality of light beams projected upon said printed matter from said source, and (3) a plurality of light collectors and a plurality of light sensitive elements for picking up reflected light originating in said beams and reflected from said printed matter, means for converting changes in the amount of light picked up by said elements into voltage pulses, a pulse counting circuit and a pulse length detecting circuit coupled to said last mentioned means for generating groups of voltages representative of the number and of the length of pulses received by said circuits due to changes in the amount of reflected light picked up from said printed matter by said elements during scanning, a function matrix connected to said circuits for separating said voltage groups, sound producing means, and means for controlling said sound producing means in response to voltage groups originating in said circuits and passing through said matrix.

VLADIMIR K. ZWORYKIN.
LESLIE E. FLORY.

REFERENCES CITED

The following references are of record in the file of this patent:

UNITED STATES PATENTS

| Number | Name | Date |
|---|---|---|
| 1,602,469 | Watson | Oct. 12, 1949 |
| 1,751,584 | Hausell | Mar. 25, 1930 |
| 1,910,586 | Bartholomew | May 23, 1933 |
| 2,002,208 | McFarlane | May 21, 1935 |
| 2,198,248 | Hansell | Apr. 23, 1940 |
| 2,210,706 | Carlisle | Aug. 6, 1940 |
| 2,228,782 | Sharples | Jan. 14, 1941 |
| 2,380,667 | Morrison | July 31, 1945 |